United States Patent
Wang et al.

(10) Patent No.: US 9,948,328 B2
(45) Date of Patent: Apr. 17, 2018

(54) RADIO FREQUENCY FRONT-END SYSTEM, SIGNAL TRANSMISSION CONTROL METHOD, AND MOBILE TERMINAL

(71) Applicant: Huawei Device (Dongguan) Co., Ltd., Dongguan (CN)

(72) Inventors: Hongyu Wang, Shenzhen (CN); Xiang Che, Shanghai (CN); Qiuliang Xu, Shanghai (CN); Liping Yang, Shanghai (CN); Jia Xu, Shanghai (CN); Zhigang Liu, Beijing (CN); Zhenyu Liu, Beijing (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 0 days.

(21) Appl. No.: 15/129,352

(22) PCT Filed: Mar. 26, 2014

(86) PCT No.: PCT/CN2014/074111
§ 371 (c)(1),
(2) Date: Sep. 26, 2016

(87) PCT Pub. No.: WO2015/143640
PCT Pub. Date: Oct. 1, 2015

(65) Prior Publication Data
US 2017/0126257 A1    May 4, 2017

(51) Int. Cl.
*H04L 27/00* (2006.01)
*H04B 1/00* (2006.01)
(Continued)

(52) U.S. Cl.
CPC ......... *H04B 1/0057* (2013.01); *H04B 1/0064* (2013.01); *H01Q 1/243* (2013.01);
(Continued)

(58) Field of Classification Search
CPC ........ H01Q 1/521; H01Q 1/243; H01Q 5/314; H01Q 5/00; H04B 15/02; H04B 1/006; H04B 1/0064; H04B 1/18; H04B 1/40
(Continued)

(56) References Cited

U.S. PATENT DOCUMENTS

| | | | | |
|---|---|---|---|---|
| 6,560,443 B1 * | 5/2003 | Vaisanen | ................ | H01Q 3/24 455/553.1 |
| 2009/0312050 A1 * | 12/2009 | Tang | ..................... | H04B 1/006 455/553.1 |

(Continued)

FOREIGN PATENT DOCUMENTS

| | | |
|---|---|---|
| CN | 101304580 A | 11/2008 |
| CN | 102111176 A | 6/2011 |

(Continued)

OTHER PUBLICATIONS

RFMD, "RF1602 Broadband SPDT Switch," Product Datasheet; Package: QFN, 2mm×2mm×0.55mm; DS121113, Dec. 3, 2012, 4 pages.

*Primary Examiner* — Leila Malek
(74) *Attorney, Agent, or Firm* — Slater Matsil, LLP (57) ABSTRACT

Embodiments disclose a radio frequency front-end system and a signal transmission control method. The system includes a first antenna, a second antenna, a first radio frequency circuit, a second radio frequency circuit, and a controller. The controller is configured to acquire a transmission frequency band selected by the first radio frequency circuit, and when a frequency in the transmission frequency band selected by the first radio frequency circuit is less than a preset frequency, to control the first radio frequency circuit to connect to the second antenna. The controller is further configured to disconnect a connection between the second radio frequency circuit and the second antenna, or to main- (Continued)

tain an open circuit state between the second radio frequency circuit and the second antenna.

13 Claims, 6 Drawing Sheets

(51) Int. Cl.
| | | |
|---|---|---|
| H01Q 1/52 | (2006.01) | |
| H01Q 5/314 | (2015.01) | |
| H04B 15/02 | (2006.01) | |
| H01Q 1/24 | (2006.01) | |
| H01Q 5/00 | (2015.01) | |

(52) U.S. Cl.
CPC ............... *H01Q 1/521* (2013.01); *H01Q 5/00* (2013.01); *H01Q 5/314* (2015.01); *H04B 1/006* (2013.01); *H04B 15/02* (2013.01)

(58) Field of Classification Search
USPC .......................................................... 375/295
See application file for complete search history.

(56) References Cited

U.S. PATENT DOCUMENTS

| | | |
|---|---|---|
| 2012/0113873 A1 | 5/2012 | Sanchez et al. |
| 2012/0294338 A1* | 11/2012 | Zhan ........................ H01Q 3/30 375/219 |
| 2013/0072135 A1 | 3/2013 | Banerjea et al. |

FOREIGN PATENT DOCUMENTS

| | | |
|---|---|---|
| EP | 2672630 A1 | 12/2013 |
| JP | 2001024579 A | 1/2001 |

* cited by examiner

RADIO FREQUENCY FRONT-END SYSTEM, SIGNAL TRANSMISSION CONTROL METHOD, AND MOBILE TERMINAL

CROSS-REFERENCE TO RELATED APPLICATIONS

This application claims the benefit of International filing No. PCT/CN2014/074111, filed on Mar. 26, 2014, which application is hereby incorporated herein by reference.

TECHNICAL FIELD

The present invention relates to the communications field, and in particular, to a radio frequency front-end system, a signal transmission control method, and a mobile terminal.

BACKGROUND

Currently, to meet ever-increasing user requirements on download rates and multi-standard roaming of mobile terminals, an operator not only makes transition from 2G and 3G networks to a 4G LTE network, but also provides a mode of multi-network roaming and a mode of simultaneous voice and data processing, such as SVDO, SV-LTE, and SG-LTE. For example, China Mobile provides a mode of multiple communications standards and multiple frequency bands, where the multiple communications standards are the TD-LTE communications standard, the FDD-LTE communications standard, the GSM communications standard, the TD-SCDMA communications standard, and the WCDMA communications standard, and a quantity of supported frequency bands is from frequency band 10 to frequency band 13. For better user experience, China Mobile provides a concept of SG-LTE, in which voice and data services can be processed simultaneously, that is, voice is processed in a GSM network and data is processed in a TD-SCDMA or TD-LTE network simultaneously.

For the mode of simultaneous voice and data, at least two radio frequency circuits and at least two broadband multi-band primary antennas are needed. Generally, two broadband multi-band antennas both need to cover a low-frequency signal and a high-frequency signal, and the two broadband multi-band antennas have a requirement for a large space size, which can hardly be implemented for a mobile terminal that has an ever-decreasing size.

SUMMARY

A technical problem to be resolved by embodiments of the present invention is to provide a radio frequency front-end system and a signal transmission control method, which can resolve a problem that an antenna size of a mobile terminal occupies large space in the prior art.

To resolve the foregoing technical problem, an embodiment of the present invention provides a radio frequency front-end system, including: a first antenna, a second antenna, a first radio frequency circuit, a second radio frequency circuit, and a control apparatus. The control apparatus is configured to acquire a transmission frequency band selected by the first radio frequency circuit, and if a frequency in the transmission frequency band selected by the first radio frequency circuit is less than a preset frequency, control the first radio frequency circuit to connect to the second antenna, and disconnect a connection between the second radio frequency circuit and the second antenna, or maintain an open circuit state between the second radio frequency circuit and the second antenna.

With reference to a first possible implementation manner of the first aspect, in a second possible implementation manner, the control apparatus is further configured to: if the frequency in the transmission frequency band selected by the first radio frequency circuit is not less than the preset frequency, control the first radio frequency circuit to connect to the first antenna.

With reference to the first possible implementation manner of the first aspect, in a second possible implementation manner, the radio frequency front-end system further includes: a first gating circuit, configured to connect a connection between a working circuit of the first radio frequency circuit and the control apparatus; and a second gating circuit, configured to connect a connection between a working circuit of the second radio frequency circuit and the control apparatus. The working circuit of the first radio frequency circuit is a working circuit corresponding to one of multiple frequency bands that are supported by the first radio frequency circuit; the working circuit of the second radio frequency circuit is a working circuit corresponding to one of multiple frequency bands that are supported by the second radio frequency circuit. The control apparatus is specifically configured to acquire a frequency band corresponding to the working circuit of the first radio frequency circuit, and if a frequency in the frequency band corresponding to the working circuit of the first radio frequency circuit is less than the preset frequency, control the working circuit of the first radio frequency circuit to connect to the second antenna, and disconnect a connection between the working circuit of the second radio frequency circuit and the second antenna, or maintain an open circuit state between the working circuit of the second radio frequency circuit and the second antenna.

With reference to the second possible implementation manner of the first aspect, in a third possible implementation manner, the first gating circuit is a first single-pole multi-throw switch, a movable end of the first single-pole multi-throw switch is connected to the control apparatus, k non-movable ends of the first single-pole multi-throw switch are respectively connected to k working circuits of the first radio frequency circuit, and the k working circuits are working circuits corresponding to i frequency bands that are supported by the first radio frequency circuit, where i and k are both positive integers, and i is greater than or equal to k; when i is greater than k, at least two frequency bands that are supported by the first radio frequency circuit are corresponding to a same working circuit. The second gating circuit is a second single-pole multi-throw switch, a movable end of the second single-pole multi-throw switch is connected to the control apparatus, m non-movable ends of the second single-pole multi-throw switch are respectively connected to m working circuits of the second radio frequency circuit, and the m working circuits are working circuits corresponding to n frequency bands that are supported by the second radio frequency circuit, where m and n are both positive integers, and n is greater than or equal to m; when n is greater than m, at least two frequency bands that are supported by the second radio frequency circuit are corresponding to a same working circuit.

With reference to the third possible implementation manner of the first aspect, in a fourth possible implementation manner, the control apparatus includes a first single-pole double-throw switch, a second single-pole double-throw switch, and a controller. A movable end of the first single-pole double-throw switch is connected to the movable end of the first single-pole multi-throw switch, the k non-movable ends of the first single-pole multi-throw switch are respectively connected to the k working circuits of the first radio frequency circuit, and the k working circuits are the working circuits corresponding to the i frequency bands that are supported by the first radio frequency circuit, where i and k are both positive integers, and i is greater than or equal to k; when i is greater than k, the at least two frequency bands that are supported by the first radio frequency circuit are corresponding to the same working circuit; a first non-movable end of the first single-pole double-throw switch is connected to the first antenna, and a second non-movable end of the first single-pole double-throw switch is connected to a first non-movable end of the second single-pole double-throw switch. A movable end of the second single-pole double-throw switch is connected to the second antenna, a second non-movable end of the second single-pole double-throw switch is connected to the movable end of the second single-pole multi-throw switch, the m non-movable ends of the second single-pole multi-throw switch are respectively connected to the m working circuits of the second radio frequency circuit, and the m working circuits are the working circuits corresponding to n frequency bands that are supported by the second radio frequency circuit, where m and n are both positive integers, and n is greater than or equal to m; when n is greater than m, the at least two frequency bands that are supported by the second radio frequency circuit are corresponding to the same working circuit. The controller is specifically configured to acquire the transmission frequency band selected by the first radio frequency circuit, and if the frequency in the transmission frequency band is less than the preset frequency, connect the movable end and the second non-movable end of the first single-pole double-throw switch, and connect the movable end and the first non-movable end of the second single-pole double-throw switch.

With reference to the fourth possible implementation manner of the first aspect, in a fifth possible implementation manner, the controller is further configured to: if the frequency in the transmission frequency band is not less than the preset frequency, connect the movable end and the first non-movable end of the first single-pole double-throw switch.

A second aspect of the embodiments of the present invention provides a signal transmission control method in a radio frequency front-end system, where the radio frequency front-end system includes: a first antenna, a second antenna, a first radio frequency circuit, a second radio frequency circuit, and a control apparatus. The signal transmission control method includes: acquiring, by the control apparatus, a transmission frequency band selected by the first radio frequency circuit; and determining, by the control apparatus, whether a frequency in the transmission frequency band is less than a preset frequency, and if yes, controlling the first radio frequency circuit to connect to the second antenna, and disconnecting a connection between the second radio frequency circuit and the second antenna, or maintaining an open circuit state between the second radio frequency circuit and the second antenna.

With reference to the second aspect, in a first possible implementation manner, the signal transmission control method further includes: if the control apparatus determines that the transmission frequency band selected by the first radio frequency circuit is not less than the preset frequency, controlling the first radio frequency circuit to connect to the first antenna.

With reference to the second aspect, in a second possible implementation manner, the signal transmission control method further includes: controlling a first gating circuit to connect a connection between a working circuit of the first radio frequency circuit and the control apparatus; and controlling a second gating circuit to connect a connection between a working circuit of the second radio frequency circuit and the control apparatus, where the working circuit of the first radio frequency circuit is a working circuit corresponding to one of multiple frequency bands that are supported by the first radio frequency circuit, and the working circuit of the second radio frequency circuit is a working circuit corresponding to one of multiple frequency bands that are supported by the second radio frequency circuit.

With reference to the second possible implementation manner of the second aspect, in a third possible implementation manner, the first gating circuit is a first single-pole multi-throw switch, a movable end of the first single-pole multi-throw switch is connected to the control apparatus, k non-movable ends of the first single-pole multi-throw switch are respectively connected to k working circuits of the first radio frequency circuit, and the k working circuits are working circuits corresponding to i frequency bands that are supported by the first radio frequency circuit, where i and k are both positive integers, and i is greater than or equal to k; when i is greater than k, at least two frequency bands that are supported by the first radio frequency circuit are corresponding to a same working circuit. The second gating circuit is a second single-pole multi-throw switch, a movable end of the second single-pole multi-throw switch is connected to the control apparatus, m non-movable ends of the second single-pole multi-throw switch are respectively connected to m working circuits of the second radio frequency circuit, and the m working circuits are working circuits corresponding to n frequency bands that are supported by the second radio frequency circuit, where m and n are both positive integers, and n is greater than or equal to m; when n is greater than m, at least two frequency bands that are supported by the second radio frequency circuit are corresponding to a same working circuit.

With reference to the third possible implementation manner of the second aspect, in a fourth possible implementation manner, the control apparatus includes a first single-pole double-throw switch, a second single-pole double-throw switch, and a controller. A movable end of the first single-pole double-throw switch is connected to the movable end of the first single-pole multi-throw switch, the k non-movable ends of the first single-pole multi-throw switch are respectively connected to the k working circuits of the first radio frequency circuit, and the k working circuits are the working circuits corresponding to the i frequency bands that are supported by the first radio frequency circuit, where i and k are both positive integers, and i is greater than or equal to k; when i is greater than k, the at least two frequency bands that are supported by the first radio frequency circuit are corresponding to the same working circuit; a first non-movable end of the first single-pole double-throw switch is connected to the first antenna, and a second non-movable end of the first single-pole double-throw switch is connected to a first non-movable end of the second single-pole double-throw switch. A movable end of the second single-pole double-throw switch is connected to the second antenna, a second non-movable end of the second single-pole double-throw switch is connected to the movable end of the second single-pole multi-throw switch, the m non-movable ends of the second single-pole multi-throw switch are respectively connected to the m working circuits of the second radio frequency circuit, and the m working circuits are the working circuits corresponding to the n frequency bands that are supported by the second radio frequency circuit, where m and n are both positive integers, and n is greater than or equal to m; when n is greater than m, the at least two frequency bands that are supported by the second radio frequency circuit are corresponding to the same working circuit. The control apparatus determines whether the frequency in the transmission frequency band is less than the preset frequency, and if yes, steps of controlling the first radio frequency circuit to connect to the second antenna, and disconnecting a connection between the second radio frequency circuit and the second antenna, or maintaining an open circuit state between the second radio frequency circuit and the second antenna specifically include: if the transmission frequency band is less than the preset frequency, connecting, by the controller, the movable end and the second non-movable end of the first single-pole double-throw switch, and connecting the movable end and the first non-movable end of the second single-pole double-throw switch.

With reference to the fourth possible implementation manner of the second aspect, in a fifth possible implementation manner, the signal transmission control method further includes: if the frequency in the transmission frequency band is less than the preset frequency, connecting, by the controller, the movable end and the first non-movable end of the first single-pole double-throw switch.

A third aspect of the embodiments of the present invention provides a mobile terminal, including any one of the foregoing radio frequency front-end systems.

The following beneficial effects are brought by implementing the embodiments of the present invention.

A transmission frequency band selected by the first radio frequency circuit is acquired, and if a frequency in the transmission frequency band selected by the first radio frequency circuit is less than the preset frequency, a target signal is transmitted by using a second antenna, and a second radio frequency circuit is prohibited from performing transmission; a first antenna of a radio frequency front-end system is only responsible for transmitting a high-frequency signal, which can effectively reduce a size of the first antenna, and therefore a requirement of a dual-antenna terminal on an antenna size is reduced.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A radio frequency front-end system and a signal transmission method that are provided in the following embodiments of the present invention may be applicable to a terminal that supports multiple communications standards and frequency bands, for example, an evolved Universal Mobile Telecommunication System (UMTS for short) territorial communications standard (E-UTRAN for short), a UMTS territorial communications standard (UTRAN for short), a Global System for Mobile Communications (GSM for short)/Enhanced Data rate for GSM Evolution (EDGE for short) communications standard (GERAN for short), and a non-3rd Generation Partner Project (3GPP for short) communications standard.

Figure 1:
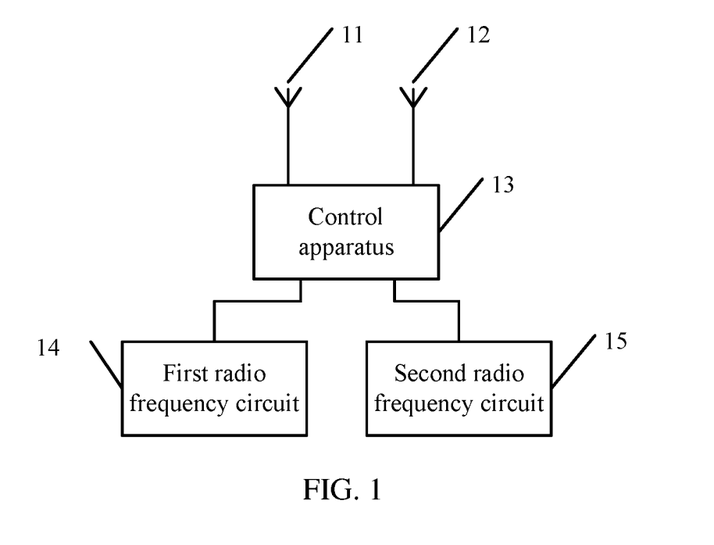
FIG. 1 is a schematic structural diagram of a radio frequency front-end system according to a first embodiment of the present invention.

Refer to FIG. 1, which is a schematic structural diagram of a radio frequency front-end system according to a first embodiment of the present invention. In this embodiment, the radio frequency front-end system includes a first antenna 11, a second antenna 12, a control apparatus 13, a first radio frequency circuit 14, and a second radio frequency circuit 15.

The first radio frequency circuit 14 and the second radio frequency circuit 15 are both configured to modulate a baseband signal to a high-frequency carrier for transmission by using an antenna, and demodulate a high-frequency signal received by using the antenna to a baseband signal. The first radio frequency circuit 14 supports multiple communications standards and multiple frequency bands, and may use frequency division duplex FDD (Frequency Division Duplex) or time division duplex TDD (Time Division Duplex) to transmit and receive a signal. The second radio frequency circuit 15 also supports multiple communications standards and multiple frequency bands, and may use frequency division duplex or time division duplex to transmit and receive a signal. For example, the first radio frequency circuit 14 may support a GSM communications standard (frequency band number: B2/B3/B5/B8), a UMTS communications standard (frequency band number: B1/B2/B5), a TD-LTE communications standard (frequency band number: B38/B39/B40/B41), an FD-LTE mode (frequency band number: B3/B7), and a TDS communications standard (frequency band number: B34/B39). The second radio frequency circuit 14 also supports the foregoing communications standards and frequency bands. An uplink frequency band and a downlink frequency band that are corresponding to a frequency band number may be queried from 3GPP TS 36.101 and TS 25.101. For example, UMTS B1 is in a frequency division duplex mode, and an uplink frequency band is: 1920 MHz-1980 MHz; TDS B34 is in a time division duplex mode, and an uplink frequency band and a downlink frequency band are the same: 2010 MHz-2025 MHz; GSM B2 is in the frequency division duplex mode, an uplink frequency band is: 1850-1910 MHz, a downlink frequency band is: 1930 MHz-1990 MHz. A frequency band corresponding to another frequency band number is not described herein again.

The first antenna 11 and the second antenna 12 are both configured to receive or transmit a high-frequency signal.

The control apparatus 13 acquires a transmission frequency band selected by the first radio frequency circuit 14, and if a frequency in the transmission frequency band selected by the first radio frequency circuit 14 is less than the preset frequency, controls the first radio frequency circuit to connect to the second antenna, and disconnects a connection between the second radio frequency circuit and the second antenna, or maintains an open circuit state between the second radio frequency circuit and the second antenna.

Specifically, the control apparatus 13 acquires the transmission frequency band selected by the first radio frequency circuit 14, and compares a value of the frequency in the transmission frequency band selected by the first radio frequency circuit 14 with a value of the preset frequency. A comparison method may be determining a frequency range of the transmission frequency band selected by the first radio frequency circuit 14, and if each frequency randomly selected from the frequency band range is less than the preset frequency, determining that the frequency in the transmission frequency band selected by the first radio frequency circuit 14 is less than the preset frequency; if a frequency randomly selected from the frequency range is not less than the preset frequency, determining that the frequency in the transmission frequency band selected by the first radio frequency circuit 14 is greater than the preset frequency. It is assumed that the preset frequency is set to 900 MHz, and the control apparatus 13 obtains that the transmission frequency band selected by the first radio frequency circuit 14 is 830 MHz-840 MHz (an uplink frequency band of B5), and then determines that the frequency in the transmission frequency band selected by the first radio frequency circuit 14 is less than the preset frequency; the control apparatus 14 controls the first radio frequency circuit 14 to connect to the second antenna 12, and disconnects a connection between the second radio frequency circuit 15 and the second antenna 12, or maintains an open circuit state between the second radio frequency circuit 14 and the second antenna 12.

Optionally, the control apparatus 13 is further configured to: if the frequency in the transmission frequency band selected by the first radio frequency circuit is less than the preset frequency, control the first radio frequency circuit to connect to the first antenna.

It can be understood that, a connection or disconnection between a radio frequency circuit (the first radio frequency circuit or the second radio frequency circuit) and an antenna (the first antenna or the second antenna) is for signal transmission; if the radio frequency circuit is connected to the antenna, it indicates that the radio frequency circuit can transmit a signal by using the antenna; and if the radio frequency circuit is disconnected from the antenna, it indicates that the radio frequency circuit cannot transmit and receive a signal by using the antenna. The connection described herein may not necessarily be a physical connection, and may also be physical disconnection, and a signal is transmitted in a coupling manner; this manner is also the connection mentioned in the present invention.

By implementing this embodiment of the present invention, a control apparatus acquires a transmission frequency band selected by the first radio frequency circuit, and if a frequency in the transmission frequency band selected by the first radio frequency circuit is less than a preset frequency, transmits a signal by using a second antenna, and prohibits a second radio frequency circuit from performing transmission; a first antenna of a radio frequency front-end system is only responsible for transmitting a signal in a high frequency band, which can effectively reduce a size of the first antenna, and therefore a requirement of a dual-antenna terminal on an antenna size is reduced.

Figure 2:
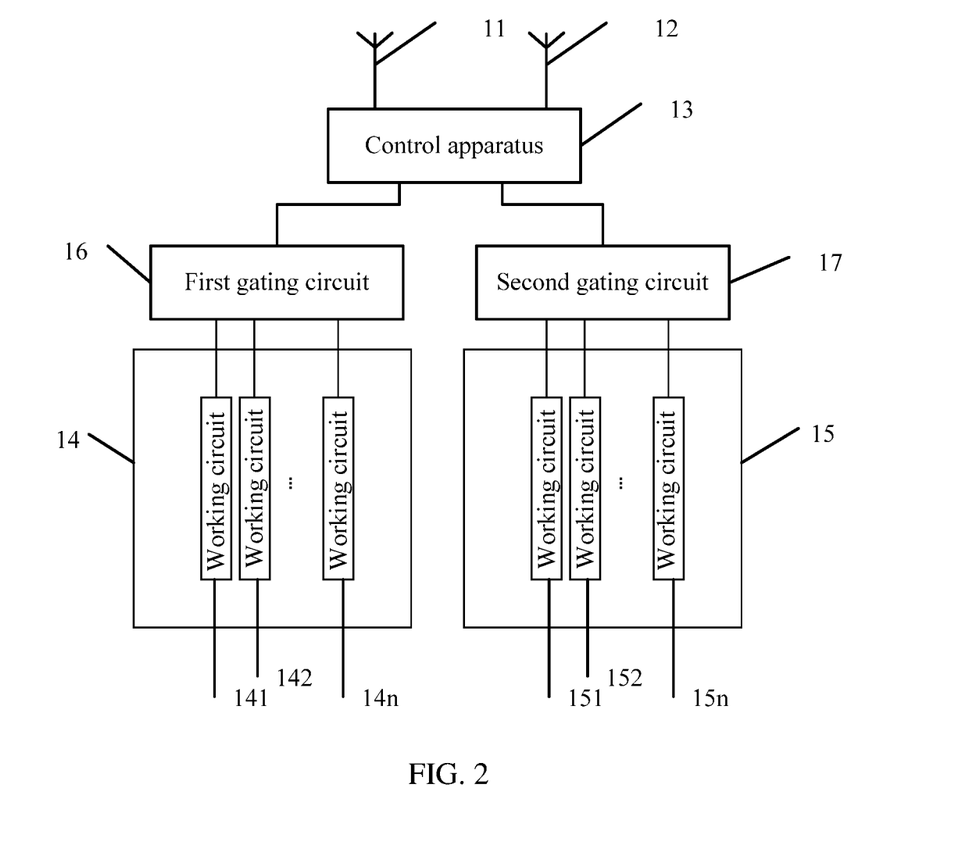
FIG. 2 is a schematic structural diagram of a radio frequency front-end system according to a second embodiment of the present invention.

Refer to FIG. 2, which is a schematic structural diagram of a radio frequency front-end system according to a second embodiment of the present invention. In the present invention, in addition to a first antenna 11, a second antenna 12, a control apparatus 13, a first radio frequency circuit 14, and a second radio frequency 15, the radio frequency front-end system further includes a first gating circuit 16 and a second gating circuit 17, where the first gating circuit 16 is disposed between the control apparatus 13 and the first radio frequency circuit 14, and is configured to connect a connection between a working circuit of the first radio frequency circuit 14 and the control apparatus 13, and the second gating circuit 17 is disposed between the control apparatus 13 and the second radio frequency circuit 15, and is configured to connect a connection between a working circuit of the second radio frequency circuit 15 and the control apparatus 13; the working circuit of the first radio frequency circuit 14 is a working circuit corresponding to one of multiple frequency bands that are supported by the first radio frequency circuit 14, and each working circuit processes one or more signals in the multiple frequency bands that are supported by the first radio frequency circuit; and the working circuit of the second radio frequency circuit 15 is a working circuit corresponding to one of multiple frequency bands that are supported by the second radio frequency circuit 15, and each working circuit is configured to process a signal in one or more frequency bands of the multiple frequency bands that are supported by the second radio frequency circuit.

For example, communications standards and frequency bands that are supported by the first radio frequency circuit are GSM (B2/B8), UTMS (B5), FD-LTE (B3/B7), TD-LTE (B38/B40/B41), and TDS (B34/B39); the first radio frequency circuit includes four working circuits: a working circuit 1, a working circuit 2, a working circuit 3, and a working circuit 4, where the working circuit 1 processes a signal in the GSM (B2/B8) frequency band, the working circuit 2 processes a signal in the UTMS (B5) frequency band, the working circuit 3 processes a signal in the TD-LTE (B38/B40/B41) frequency band, and the working circuit 4 processes a signal in the TDS (B34/B39) frequency band; if the first radio frequency circuit selects to transmit a signal in the B1 frequency band, the first gating circuit 16 connects a connection between the working circuit 1 in the working circuits of the first radio frequency circuit 14 and the control apparatus 13. A working process of the second gating circuit is the same as that of the first gating circuit, and details are not described herein again.

Preferably, the first gating circuit 16 is a first single-pole multi-throw switch, and the second gating circuit 17 is a second single-pole multi-throw switch; a movable end of the first single-pole multi-throw switch is connected to a corresponding working circuit in the first radio frequency circuit 14, and a non-movable end of the first single-pole multi-throw switch is connected to the control apparatus 13, and the first single-pole multi-throw switch connects the working circuit of the first radio frequency circuit 14 and the control apparatus 13 by using a switch blade; a movable end of the second single-pole multi-throw switch is connected to a corresponding working circuit of the second radio frequency circuit 15, and a non-movable end of the second single-pole multi-throw switch is connected to the control apparatus 13, and the second single-pole multi-throw switch connects the working circuit of the second radio frequency circuit 14 and the control apparatus 13 by using a switch blade.

Figure 3:
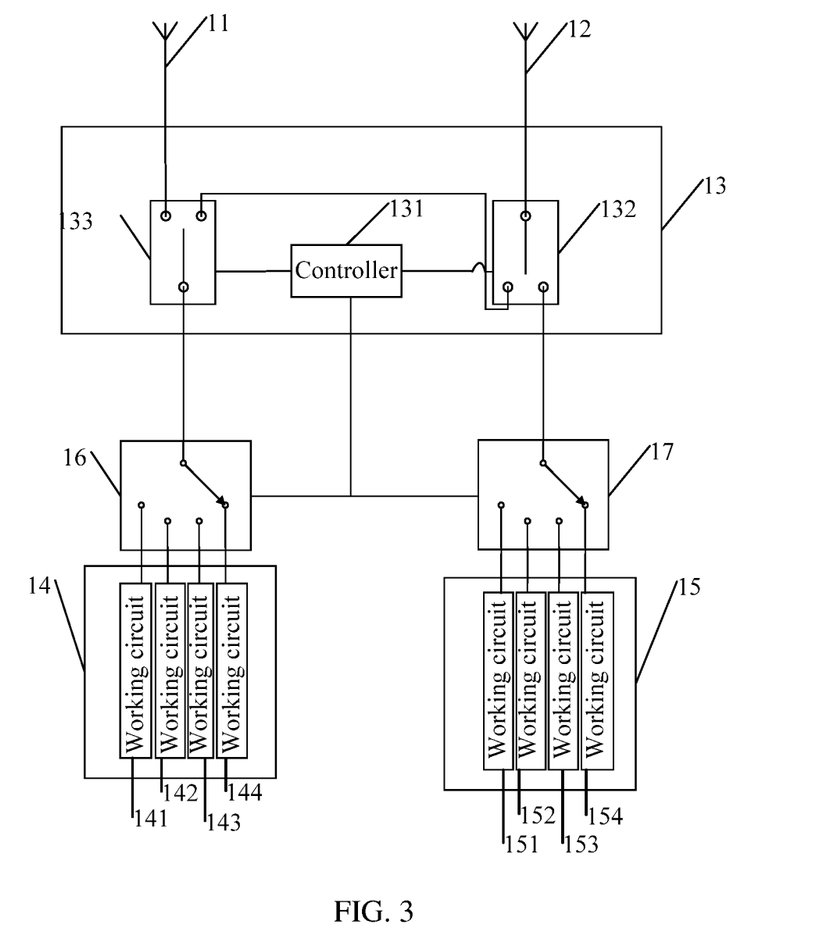
FIG. 3 is a schematic structural diagram of a radio frequency front-end system according to a third embodiment of the present invention.

Refer to FIG. 3, which is a schematic structural diagram of a radio frequency front-end system according to a third embodiment of the present invention. In this embodiment of the present invention, the radio frequency front-end system includes a first antenna 11, a second antenna 12, a control apparatus 13, a first radio frequency circuit 14, a second radio frequency circuit 15, a first gating circuit 16, and a second gating 17. In FIG. 3, the first gating circuit 16 and the second gating circuit 17 both use a single-pole four-throw switch as an example; the first radio frequency circuit 14 includes a working circuit 141, a working circuit 142, a working circuit 143, and a working circuit 144; and the second radio frequency circuit 15 includes a working circuit 151, a working circuit 152, a working circuit 153, and a working circuit 154. The control apparatus 13 includes a controller 131, a first single-pole double-throw switch 133, and a second single-pole double-throw switch.

Connection relationships between the foregoing parts are as follows: A movable end of the first single-pole double-throw switch 133 is connected to a movable end of a first single-pole multi-throw switch 16, four non-movable ends of the first single-pole multi-throw switch 16 are respectively connected to the four working circuits of the first radio frequency circuit 14, a first non-movable end of the first single-pole double-throw switch 133 is connected to the first antenna 11, and a second non-movable end of the first single-pole double-throw switch 133 is connected to a first non-movable end of the second single-pole double-throw switch 132; a movable end of the second single-pole double-throw switch 132 is connected to the second antenna 12, a second non-movable end of the second single-pole double-throw switch 132 is connected to a movable end of a second single-pole multi-throw switch 17, and four non-movable ends of the second single-pole multi-throw switch 17 are respectively connected to the four working circuits of the second radio frequency circuit 15; and the controller 131 is separately connected to the first single-pole double-throw switch 131, the second single-pole double-throw switch 132, the first single-pole multi-throw switch 16, and the second single-pole multi-throw switch 17.

The controller 131 acquires a transmission frequency band selected by the first radio frequency circuit 14, and if a frequency in the transmission frequency band is less than a preset frequency, connects the movable end and the second non-movable end of the first single-pole double-throw switch 133, and connects the movable end and the first non-movable end of the second single-pole double-throw switch 132.

For example, in an embodiment of the present invention, it is assumed that communications standards and frequency bands that are supported by the first radio frequency circuit 14 are GSM (B2/B3/B5/B8), UTMS (B1/B2/B5), FD-LTE (B3/B7), TD-LTE (B38/B39/B40/B41), and TDS (B34/B39), and the second radio frequency circuit 15 also supports the foregoing communications standards and frequency bands. It is assumed that the preset frequency is 961 MHz. If transmission frequency bands selected by the first radio frequency circuit 14 are GSM (B5/B8) and UTMS (B5), because a frequency in the foregoing frequency bands is less than the preset frequency 961 MHz, a signal in the foregoing frequency bands needs to be transmitted by using the second antenna 12, and the controller 13 connects the movable end and the second non-movable end of the first single-pole double-throw switch 133, and simultaneously connects the movable end and the first non-movable end of the second single-pole double-throw switch 132. It can be understood that, to reduce a quantity of switching times of a switch blade of the first single-pole double-throw switch 133, when the first radio frequency circuit 14 is connected to the second antenna 12, and the second radio frequency circuit 15 does not have a transmission requirement, a high-frequency signal of the first radio frequency circuit 14 is also transmitted by using the second antenna 12 in this case.

In another embodiment of the present invention, the control apparatus may also transmit a high-frequency part of signals of a same standard by using the first antenna, and transmit a low-frequency part of the signals of the same standard by using the second antenna. For example, a signal in a high frequency band B1 of the UMTS communications standard is transmitted by using the first antenna, and a signal in a low frequency band B2/B5 of the UMTS communications standard is transmitted by using the second antenna.

Preferably, the controller 13 is further configured to: if the frequency in the transmission frequency band selected by the first radio frequency circuit 14 is not less than the preset frequency, connect the movable end and the first non-movable end of the first single-pole double-throw switch 133; and the first radio frequency circuit 14 transmits and receives a signal by using the first antenna 11.

By implementing this embodiment of the present invention, a control apparatus acquires a transmission frequency band selected by the first radio frequency circuit, and if a frequency in the transmission frequency band selected by the first radio frequency circuit is less than the preset frequency, transmits a signal by using a second antenna, and prohibits a second radio frequency circuit from performing transmission; a first antenna of a radio frequency front-end system is only responsible for transmitting a signal in a high frequency band, which can effectively reduce a size of the first antenna, and therefore a requirement of a dual-antenna terminal on an antenna size is reduced.

Figure 4:
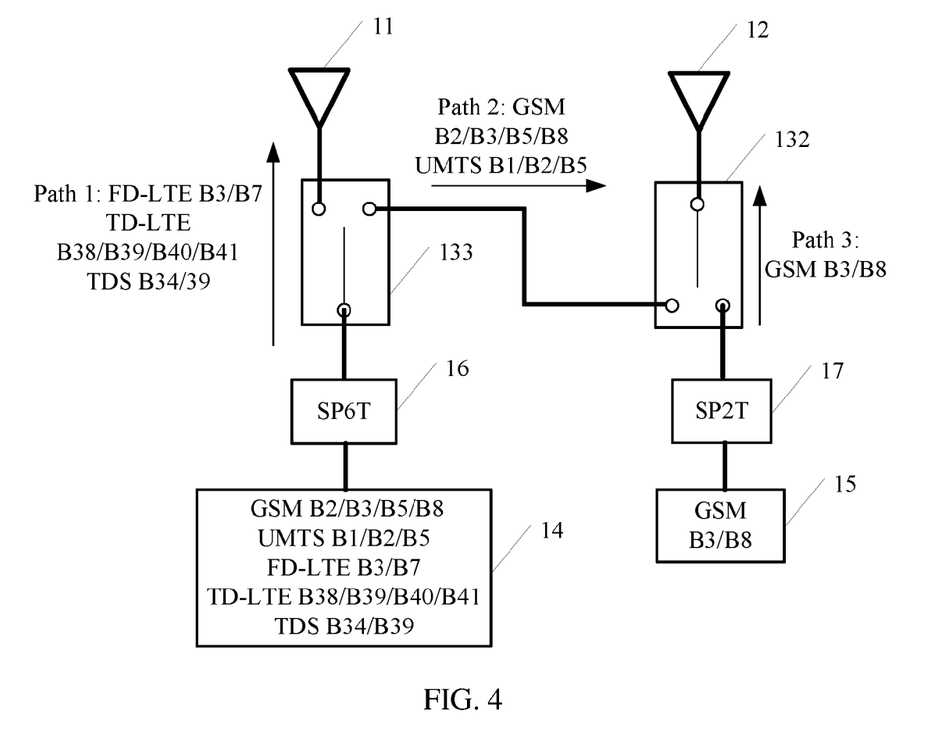
FIG. 4 is a schematic structural diagram of a radio frequency front-end system according to a fourth embodiment of the present invention.

Refer to FIG. 4, which is a schematic structural diagram of a radio frequency front-end system according to an embodiment of the present invention. In this embodiment of the present invention, the radio frequency front-end system includes a first antenna 11, a second antenna 12, a control apparatus 13, a first radio frequency circuit 14, a second radio frequency circuit 15, a first single-pole multi-throw switch 16, and a second single-pole multi-throw switch 17, where the control apparatus includes a first single-pole double-throw switch 133, a second single-pole double-throw switch 132, and a controller 131 (not shown in FIG. 4); the first single-pole multi-throw switch 16 includes six working circuits, and the second single-pole multi-throw switch 17 includes two working circuits (not shown in the figure); the first single-pole multi-throw switch 16 is a single-pole six-throw switch (SP6T), and the second single-pole multi-throw switch 17 is a single-pole double-throw switch (SP2T).

Connection relationships between the foregoing parts are as follows: The first antenna 11 is connected to a first non-movable end of the first single-pole double-throw switch 133, a second non-movable end of the first single-pole double-throw switch 133 is connected to a first non-movable end of the second single-pole double-throw switch 132, a movable end of the first single-pole double-throw switch 133 is connected to a movable end of the first single-pole multi-throw switch 16, and six non-movable ends of the single-pole multi-throw switch 16 are respectively connected to six working circuits of the first radio frequency circuit 14; the second antenna 12 is connected to a movable end of the second single-pole double-throw switch 132, a second non-movable end of the second single-pole double-throw switch 132 is connected to a movable end of the second single-pole multi-throw switch 17, and two non-movable ends of the second single-pole multi-throw switch 17 are respectively connected to two working circuits of the second radio frequency circuit 15. It is stipulated that a transmission path between the first radio frequency circuit 14 and the first antenna 11 is a path 1, a transmission path between the first radio frequency circuit 14 and the second antenna 12 is a path 2, and a transmission path between the second radio frequency circuit 15 and the second antenna 12 is a path 3.

A working principle of the radio frequency front-end system in this embodiment of the present invention is as follows: It is assumed that communications standards and frequency bands that are supported by the first radio frequency circuit are GSM (B2/B3/B5/B8), UMTS (B1/B2/B5), FD-LTE (B3/B7), TD-LTE (B38/B39/B40/B41), and TDS (B34/B39), and communications standards and frequency bands that are supported by the second radio frequency circuit 15 are GSM (B3/B8). By querying a frequency allocation table, it can be obtained that B5 and B8 frequency bands are low frequency bands distributed below 960 MHz, and the preset frequency is set to 961 MHz. If transmission frequency bands selected by the first radio frequency circuit 14 are GSM (B5/B8) and UTMS (B5), because a frequency in the foregoing frequency bands is less than the preset frequency 961 MHz, a signal in the foregoing frequency bands needs to be transmitted by using the path 2, and the controller 13 connects the movable end and the second non-movable end of the first single-pole double-throw switch 133, and simultaneously connects the movable end and the first non-movable end of the second single-pole double-throw switch 132.

It can be understood that, to reduce a quantity of switching times of the first single-pole double-throw switch 133 in the control apparatus 13, when a signal of the first radio frequency circuit 14 is transmitted by using the second antenna 12 (that is, by using the path 2), a signal of a same communications standard in another frequency band may also be transmitted by using the second antenna 12 (that is, by using the path 2). For example, for a signal of the GSM communications standard, if a GSM (B5/B8) signal in the first radio frequency circuit 14 is transmitted by using the path 2 at a previous moment, and a signal in a B2/B3 frequency band needs to be transmitted in the GSM communications standard at a current moment, the signal in the B2/B3 frequency band is also transmitted by using the path 2, and it is unnecessary to control the first single-pole double-throw switch 133 to perform a switching operation to switch a transmission path from the path 2 to the path 1.

Likewise, a UMTS signal in a B1/B2 frequency band is also transmitted by using the path 2. Therefore, in this embodiment, if a frequency in the transmission frequency band selected by the first radio frequency circuit 14 is not less than the preset frequency 961 MHz, FD-LTE (B3/B7), TD-LTE (B38/B39/B40/B41), and TDS (B34/39) signals that are supported by the first radio frequency circuit 14 are transmitted by using the path 1; if the frequency in the transmission frequency band selected by the second radio frequency circuit 14 is less than the preset frequency 961 MHz, GSM (B2/B3/B5/B8) and UTMS (B1/B2/B5) signals that are supported by the first radio frequency circuit 14 are transmitted by using the path 2. In addition, when the first radio frequency circuit 14 performs transmission by using the path 1, a GSM (B3/B8) signal supported by the second radio frequency circuit 15 selects the path 3 for transmission.

By implementing this embodiment of the present invention, a control apparatus acquires a transmission frequency band selected by the first radio frequency circuit, and if a frequency in the transmission frequency band selected by the first radio frequency circuit is less than the preset frequency, transmits a signal by using a second antenna, and prohibits a second radio frequency circuit from performing transmission; a first antenna of a radio frequency front-end system is only responsible for transmitting a signal in a high frequency band, which can effectively reduce a size of the first antenna, and therefore a requirement of a dual-antenna terminal on an antenna size is reduced.

Figure 5:
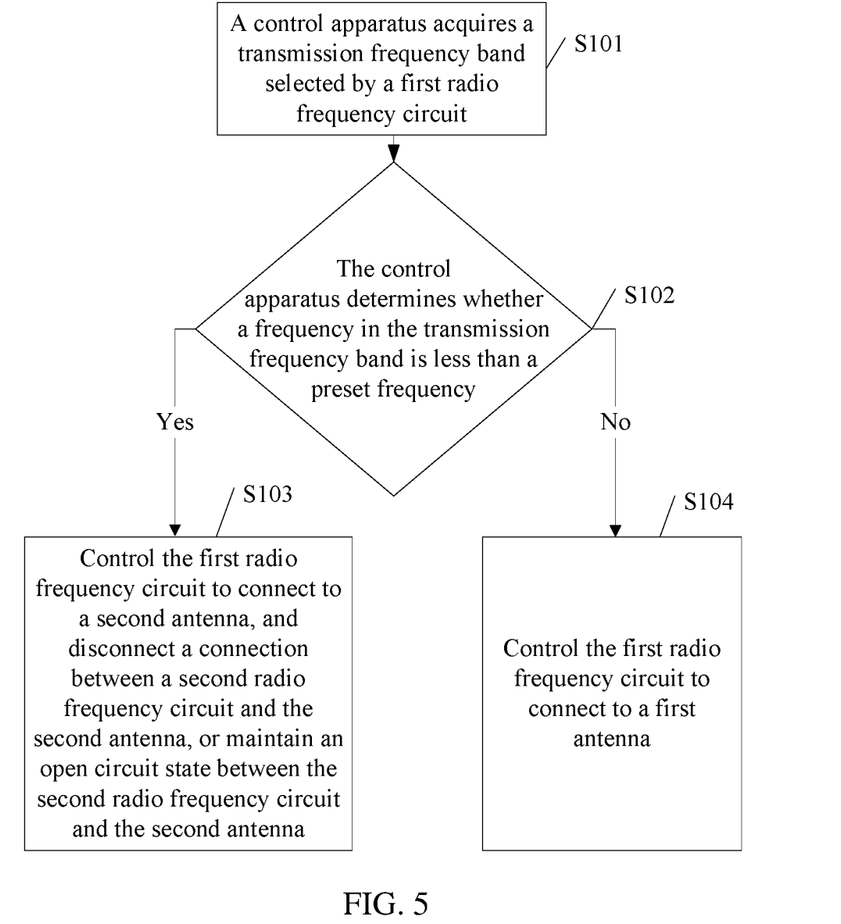
FIG. 5 is a schematic flowchart of a signal transmission control method in the radio frequency front-end system according to the first embodiment of the present invention.

Refer to FIG. 5, which is a flowchart of a signal transmission control method in the radio frequency front-end system according to the first embodiment of the present invention. In this embodiment, the method includes the following steps.

S101. A control apparatus acquires a transmission frequency band selected by a first radio frequency circuit.

S102. The control apparatus determines whether a frequency in the transmission frequency band is less than a preset frequency. If yes, perform S103, and if no, perform S104.

S103. Control the first radio frequency circuit to connect to a second antenna, or maintain an open circuit state between a second radio frequency circuit and the second antenna.

S104. Control the first radio frequency circuit to connect to a first antenna.

If yes, the first radio frequency circuit is controlled to connect to the second antenna, and a connection between the second radio frequency circuit and the second antenna is disconnected, or an open circuit state between the second radio frequency circuit and the second antenna is maintained.

Specifically, a radio frequency front-end circuit includes the first antenna, the second antenna, the first radio frequency circuit, the second radio frequency circuit, and the control apparatus. This embodiment of the present invention and the apparatus embodiment 1 are based on a same conception, and technical effect brought by this embodiment of the present invention is also the same. For details, refer to descriptions of the foregoing embodiment, and details are not described herein again.

By implementing this embodiment of the present invention, a control apparatus acquires a transmission frequency band selected by the first radio frequency circuit, and if a frequency in the transmission frequency band selected by the first radio frequency circuit is less than the preset frequency, transmits a signal by using a second antenna, and prohibits a second radio frequency circuit from performing transmission; a first antenna of a radio frequency front-end system is only responsible for transmitting a signal in a high frequency band, which can effectively reduce a size of the first antenna, and therefore a requirement of a dual-antenna terminal on an antenna size is reduced.

Figure 6:
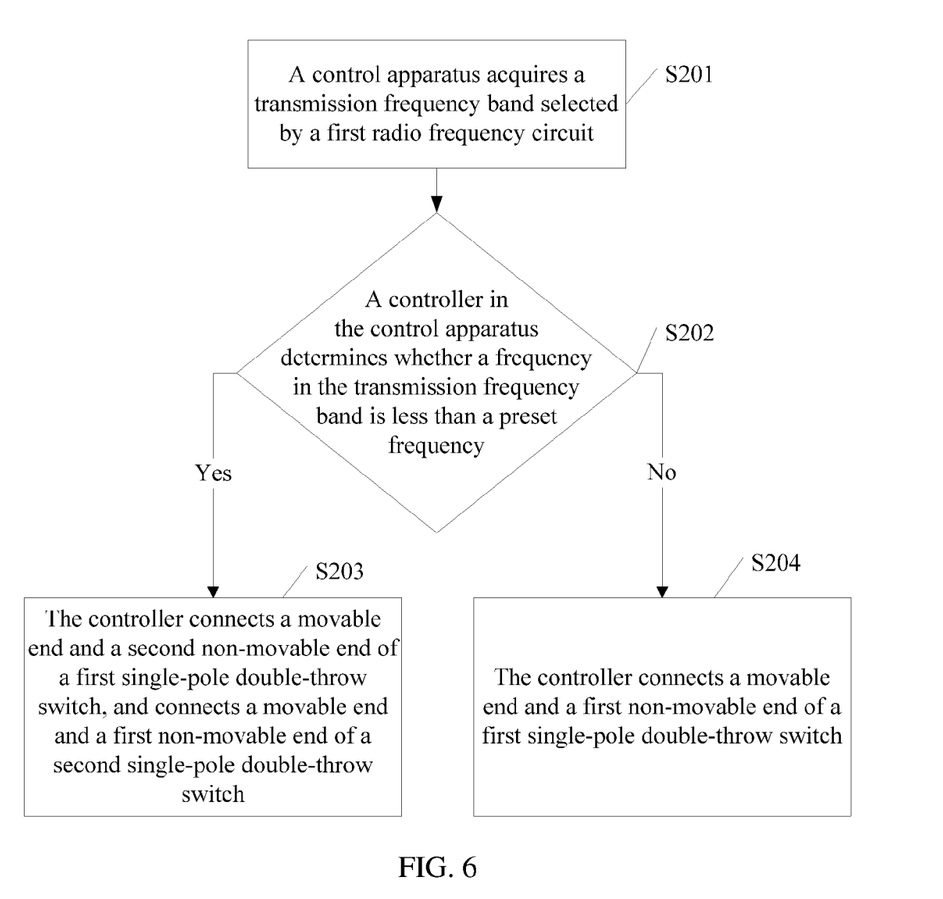
FIG. 6 is a schematic flowchart of a signal transmission control method in the radio frequency front-end system according to the second embodiment of the present invention.

Refer to FIG. 6, which is a schematic flowchart of a signal transmission control method in the radio frequency front-end system according to the second embodiment of the present invention. In this embodiment, the method includes:

S201. A control apparatus acquires a transmission frequency band selected by a first radio frequency circuit.

S202. A controller in the control apparatus determines whether a frequency in the transmission frequency band is less than a preset frequency. If a result of the determining is yes, perform S203; otherwise, perform S204.

S203. The controller connects a movable end and a second non-movable end of a first single-pole double-throw switch, and connects a movable end and a non-movable end of a second single-pole double-throw switch.

S204. The controller connects a movable end and a first non-movable end of a first single-pole double-throw switch.

In this embodiment of the present invention, the radio frequency front-end system further includes: a first single-pole multi-throw switch and a second single-pole multi-throw switch. A movable end of the first single-pole multi-throw switch is connected to the control apparatus, k non-movable ends of the first single-pole multi-throw switch are respectively connected to k working circuits of the first radio frequency circuit, and the k working circuits are working circuits corresponding to i frequency bands that are supported by the first radio frequency circuit, where i and k are both positive integers, and i is greater than or equal to k; when i is greater than k, at least two frequency bands that are supported by the first radio frequency circuit are corresponding to a same working circuit.

A movable end of the second single-pole multi-throw switch is connected to the control apparatus, m non-movable ends of the second single-pole multi-throw switch are respectively connected to m working circuits in a second radio frequency circuit, and the m working circuits are working circuits corresponding to n frequency bands that are supported by the second radio frequency circuit, where m and n are both positive integers, and n is greater than or equal to m; when n is greater than m, at least two frequency bands that are supported by the second radio frequency circuit are corresponding to a same working circuit.

The control apparatus includes the first single-pole double-throw switch, the second single-pole double-throw switch, and the controller; the movable end of the first single-pole double-throw switch is connected to a working circuit of the first radio frequency circuit by using the first single-pole multi-throw switch, the first non-movable end of the first single-pole double-throw switch is connected to a first antenna, the second non-movable end of the first single-pole double-throw switch is connected to a first non-movable end of the second single-pole double-throw switch; the movable end of the second single-pole double-throw switch is connected to a second antenna, and a second non-movable end of the second single-pole double-throw switch is connected to a working circuit of the second radio frequency circuit by using the second single-pole multi-throw switch.

This embodiment of the present invention, the apparatus embodiment 2, and the apparatus embodiment 3 are based on a same conception, and a technical effect brought by this embodiment of the present invention is also the same. For details, refer to descriptions of the foregoing embodiments, and details are not described herein again.

By implementing this embodiment of the present invention, a control apparatus acquires a transmission frequency band selected by the first radio frequency circuit, and if a frequency in the transmission frequency band selected by the first radio frequency circuit is less than the preset frequency, transmits a signal by using a second antenna, and prohibits a second radio frequency circuit from performing transmission; a first antenna of a radio frequency front-end system is only responsible for transmitting a signal in a high frequency band, which can effectively reduce a size of the first antenna, and therefore a requirement of a dual-antenna terminal on an antenna size is reduced.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely exemplary embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A radio frequency front-end system, comprising:
    a first antenna;
    a second antenna;
    a first switch coupled to the first antenna;
    a first radio frequency circuit;
    a first gating circuit coupled between the first radio frequency circuit and the first switch;
    a second switch coupled to the second antenna and to the first switch;
    a second radio frequency circuit;
    a second gating circuit coupled between the second radio frequency circuit and the second switch, the second switch coupled between the second gating circuit and the second antenna; and
    a controller coupled to the first switch, to the second switch, to the first radio frequency circuit, to the first gating circuit, to the second gating circuit, and to the second radio frequency circuit, the controller configured to:
        acquire a transmission frequency band selected by the first radio frequency circuit; and
        control the first switch and the second switch to connect the first radio frequency circuit to the second antenna, and to control the first switch and the second switch to cause the second radio frequency circuit to be disconnected from the second antenna, in response to determining that a frequency in the transmission frequency band is less than a preset frequency.

2. The radio frequency front-end system according to claim 1, wherein the controller is further configured to:
    control the first switch and the second switch to connect the first radio frequency circuit to the first antenna, in response to determining that the frequency in the transmission frequency band is greater than or equal to the preset frequency.

3. The radio frequency front-end system according to claim 2:
wherein the first gating circuit is configured to form a connection between a first working circuit of the first radio frequency circuit and the controller;
wherein the second gating circuit is configured to form a connection between a second working circuit of the second radio frequency circuit and the controller;
wherein the first working circuit of the first radio frequency circuit corresponds to one of a plurality of frequency bands that are supported by the first radio frequency circuit;
wherein the second working circuit of the second radio frequency circuit corresponds to one of a plurality of frequency bands that are supported by the second radio frequency circuit; and
wherein the controller is further configured to:
acquire a frequency band corresponding to the first working circuit of the first radio frequency circuit; and
when a frequency in the frequency band corresponding to the first working circuit of the first radio frequency circuit is less than the preset frequency, control the first gating circuit to connect the first working circuit of the first radio frequency circuit to the second antenna, and to control the first gating circuit to cause the first working circuit of the second radio frequency circuit to be disconnected from the second antenna.

4. The radio frequency front-end system according to claim 3, wherein the first gating circuit is a first single-pole multi-throw switch, a movable end of the first single-pole multi-throw switch is connected to the controller, k non-movable ends of the first single-pole multi-throw switch are respectively connected to k working circuits of the first radio frequency circuit, and the k working circuits are working circuits corresponding to i frequency bands that are supported by the first radio frequency circuit, wherein i and k are both positive integers, and i is greater than or equal to k, and wherein when i is greater than k, at least two frequency bands that are supported by the first radio frequency circuit correspond to a same working circuit; and
wherein the second gating circuit is a second single-pole multi-throw switch, a movable end of the second single-pole multi-throw switch is connected to the controller, m non-movable ends of the second single-pole multi-throw switch are respectively connected to m working circuits of the second radio frequency circuit, and the m working circuits are working circuits corresponding to n frequency bands that are supported by the second radio frequency circuit, wherein m and n are both positive integers, n is greater than or equal to m, and wherein when n is greater than m, at least two frequency bands that are supported by the second radio frequency circuit correspond to a same working circuit.

5. The radio frequency front-end system according to claim 4, wherein the first switch is a first single-pole double-throw switch and the second switch is a second single-pole double-throw switch;
wherein a movable end of the first single-pole double-throw switch is connected to the movable end of the first single-pole multi-throw switch, the k non-movable ends of the first single-pole multi-throw switch are respectively connected to the k working circuits of the first radio frequency circuit, and the k working circuits correspond to the i frequency bands that are supported by the first radio frequency circuit, wherein i and k are both positive integers, and i is greater than or equal to k, and wherein when i is greater than k, the at least two frequency bands that are supported by the first radio frequency circuit correspond to the same working circuit;
wherein a first non-movable end of the first single-pole double-throw switch is connected to the first antenna, and a second non-movable end of the first single-pole double-throw switch is connected to a first non-movable end of the second single-pole double-throw switch;
wherein a movable end of the second single-pole double-throw switch is connected to the second antenna, a second non-movable end of the second single-pole double-throw switch is connected to the movable end of the second single-pole multi-throw switch, the m non-movable ends of the second single-pole multi-throw switch are respectively connected to the m working circuits of the second radio frequency circuit, and the m working circuits are working circuits corresponding to the n frequency bands that are supported by the second radio frequency circuit, wherein m and n are both positive integers, and n is greater than or equal to m, and wherein when n is greater than m, the at least two frequency bands that are supported by the second radio frequency circuit correspond to the same working circuit; and
the controller is configured to acquire the transmission frequency band selected by the first radio frequency circuit, and when the frequency in the transmission frequency band is less than the preset frequency, to connect the movable end and the second non-movable end of the first single-pole double-throw switch, and to connect the movable end and the first non-movable end of the second single-pole double-throw switch.

6. The radio frequency front-end system according to claim 5, wherein the controller is further configured to:
when the frequency in the transmission frequency band is greater than or equal to the preset frequency, connect the movable end and the first non-movable end of the first single-pole double-throw switch.

7. A method in a radio frequency front-end system, wherein the radio frequency front-end system comprises a first antenna, a second antenna, a first radio frequency circuit, a second radio frequency circuit, a first gating circuit, a second gating circuit, and a controller, wherein the controller is coupled to a first switch, to a second switch, to the first radio frequency circuit, to the first gating circuit, to the second gating circuit, and to a second radio frequency circuit, wherein the first switch is coupled to a first antenna, wherein the first gating circuit is coupled between the first switch and the first radio frequency circuit, wherein the second switch is coupled to the second antenna and to the first switch, and wherein the second gating circuit is coupled between the second switch and the second radio frequency circuit, and wherein the method comprises:
acquiring, by the controller, a transmission frequency band selected by a first radio frequency circuit;
determining, by the controller, whether a frequency in the transmission frequency band is less than a preset frequency; and
controlling the first switch and the second switch to connect the first radio frequency circuit to the second antenna, and to control the first switch and the second switch to cause the second radio frequency circuit to be disconnected from the second antenna, in response to determining that the frequency in the transmission frequency band is less than a preset frequency.

8. The method according to claim 7, further comprising: controlling the first switch and the second switch to connect the first radio frequency circuit to the first antenna.

9. The method according to claim 7, further comprising: controlling the first gating circuit to form a connection between a first working circuit of the first radio frequency circuit and the first switch; and
controlling the second gating circuit to form a connection between a second working circuit of the second radio frequency circuit and the second switch, wherein the first working circuit of the first radio frequency circuit corresponds to one of a plurality of frequency bands that are supported by the first radio frequency circuit, and the second working circuit of the second radio frequency circuit corresponds to one of a plurality of frequency bands that are supported by the second radio frequency circuit.

10. The method according to claim 9, wherein the first gating circuit is a first single-pole multi-throw switch, a movable end of the first single-pole multi-throw switch is connected to the controller, k non-movable ends of the first single-pole multi-throw switch are respectively connected to k working circuits of the first radio frequency circuit, and the k working circuits correspond to i frequency bands that are supported by the first radio frequency circuit, wherein i and k are both positive integers, and i is greater than or equal to k, and wherein when i is greater than k, at least two frequency bands that are supported by the first radio frequency circuit correspond to a same working circuit; and
wherein the second gating circuit is a second single-pole multi-throw switch, a movable end of the second single-pole multi-throw switch is connected to the controller, m non-movable ends of the second single-pole multi-throw switch are respectively connected to m working circuits of the second radio frequency circuit, and the m working circuits correspond to n frequency bands that are supported by the second radio frequency circuit, wherein m and n are both positive integers, and n is greater than or equal to m, and wherein when n is greater than m, at least two frequency bands that are supported by the second radio frequency circuit correspond to a same working circuit.

11. The method according to claim 10, wherein the first switch is a first single-pole double-throw switch, the second switch is a second single-pole double-throw switch;
wherein a movable end of the first single-pole double-throw switch is connected to the movable end of the first single-pole multi-throw switch, the k non-movable ends of the first single-pole multi-throw switch are respectively connected to the k working circuits of the first radio frequency circuit, and the k working circuits correspond to the i frequency bands that are supported by the first radio frequency circuit, wherein i and k are both positive integers, and i is greater than or equal to k, and wherein when i is greater than k, the at least two frequency bands that are supported by the first radio frequency circuit correspond to the same working circuit;
wherein a first non-movable end of the first single-pole double-throw switch is connected to the first antenna, and a second non-movable end of the first single-pole double-throw switch is connected to a first non-movable end of the second single-pole double-throw switch;
wherein a movable end of the second single-pole double-throw switch is connected to the second antenna, a second non-movable end of the second single-pole double-throw switch is connected to the movable end of the second single-pole multi-throw switch, the m non-movable ends of the second single-pole multi-throw switch are respectively connected to the m working circuits of the second radio frequency circuit, and the m working circuits correspond to the n frequency bands that are supported by the second radio frequency circuit, wherein m and n are both positive integers, and n is greater than or equal to m, and wherein when n is greater than m, the at least two frequency bands that are supported by the second radio frequency circuit correspond to the same working circuit; and
when the frequency in the transmission frequency band is less than the preset frequency, connecting, by the controller, the movable end and the second non-movable end of the first single-pole double-throw switch, and connecting the movable end and the first non-movable end of the second single-pole double-throw switch.

12. The method according to claim 11, further comprising:
when the frequency in the transmission frequency band is less than the preset frequency, connecting, by the controller, the movable end and the first non-movable end of the first single-pole double-throw switch.

13. A mobile terminal, comprising the radio frequency front-end system according to claim 7.

* * * * *